United States Patent
Pik et al.

(10) Patent No.: US 7,376,698 B2
(45) Date of Patent: May 20, 2008

(54) SYSTEM FOR PRESERVING SCRIPTING OBJECTS AND CLONING THE OBJECTS TO A NEW DOCUMENT IN RESPONSE TO A RELOAD OF THE NEW DOCUMENT

(75) Inventors: Yossi Pik, Tel Aviv (IL); David Brutman, Tel-Aviv (IL)

(73) Assignee: SAP AG, Walldorf (DE)

( * ) Notice: Subject to any disclaimer, the term of this patent is extended or adjusted under 35 U.S.C. 154(b) by 934 days.

(21) Appl. No.: 10/659,106

(22) Filed: Sep. 9, 2003

(65) Prior Publication Data

US 2004/0230906 A1 Nov. 18, 2004

Related U.S. Application Data

(60) Provisional application No. 60/435,640, filed on Dec. 20, 2002.

(51) Int. Cl.
G06F 15/16 (2006.01)
(52) U.S. Cl. ........................ 709/203; 709/219
(58) Field of Classification Search ................ 709/203, 709/219, 202; 717/129; 714/4; 707/100; 710/1; 345/765
See application file for complete search history.

(56) References Cited

U.S. PATENT DOCUMENTS 6,345,276 B1 * 2/2002 Lee ............................ 707/100
2002/0169818 A1 * 11/2002 Stewart et al. .............. 709/202
2002/0194262 A1 * 12/2002 Jorgenson .................... 709/203
2003/0058277 A1 * 3/2003 Bowman-Amuah ......... 345/765
2003/0105805 A1 * 6/2003 Jorgenson .................... 709/203
2003/0233594 A1 * 12/2003 Earl ............................. 714/4
2004/0083457 A1 * 4/2004 Boucher ..................... 717/129
2004/0103221 A1 * 5/2004 Rosu et al. .................... 710/1

* cited by examiner

Primary Examiner—Le Hien Luu
(74) Attorney, Agent, or Firm—Mintz, Levin, Cohn, Ferris, Glovsky and Popeo, P.C.

(57) ABSTRACT

Systems and techniques to preserve state information in a client-server environment. In general, in one implementation, the technique includes: storing, in a shared memory of a client, a scripting object that retains state information for an original document, and cloning the stored scripting object to a newly loaded document. Storing the scripting object can involve copying a scripting object reference to the shared memory to cause retention of the scripting object by the client during document loading. Cloning the stored scripting object to the newly loaded document can be performed recursively, and can involve creating a new scripting object in the new document and copying data from the stored scripting object to the new scripting object. The state information retained in the scripting object can be navigation information associated with the loaded document, and the loaded document can be a portal page in a portal system.

22 Claims, 6 Drawing Sheets

SYSTEM FOR PRESERVING SCRIPTING OBJECTS AND CLONING THE OBJECTS TO A NEW DOCUMENT IN RESPONSE TO A RELOAD OF THE NEW DOCUMENT

CROSS REFERENCE TO RELATED APPLICATIONS

This application claims the benefit of priority from U.S. Provisional Application entitled "STORING OF SCRIPTING OBJECTS ON CLIENT", filed Dec. 20, 2002, application Ser. No. 60/435,640.

BACKGROUND

The following description relates to loading documents in a client-server environment.

When writing dynamic pages that run on a browser, JavaScript (JS) objects are frequently used. In general, events or actions (including user actions) can be reflected in those JS objects. Thus, a JS object can hold state information that reflects a specific flow of actions performed. These actions are commonly performed by the user but can be a result of other input sources. In some client-server environments, state information in JS objects is sent to and stored at the server in response to each action that changes the state information. In other client-server environments, the server maintains its own record of client state based on the page requests received from the client. In still other client-server environments, state information need not be stored because state information is not necessary. But when state information needs to be maintained, caching the state information on the server can be used to prevent a loss of current state in a browser when a page with client-side dynamic behavior is reloaded.

SUMMARY

The present description includes systems and techniques relating to preserving state information in a client-server environment. The present inventors recognized that conventional techniques for preserving client-side state information can require sending object state information to a server for every dynamically reflected user interaction. Accordingly, the inventors developed client-side state-preservation systems and techniques that provide advantages over server-side caching, and can thus be implemented in situations where server caching may be non-feasible due to performance considerations. The present systems and techniques can avoid the performance costs caused by serialization of the scripting objects to stream, can reduce communication traffic, and can result in reduced needs for additional server memory, resources, and/or management.

In one aspect, the present systems and techniques involve storing a scripting object that retains state information for a document in a shared memory of a client, and in response to a request to reload the document, cloning the stored scripting object to the reloaded document. The scripting objects can be JavaScript objects, and the client-server environment can include a portal and a client executing a browser to present documents obtained through the portal. By maintaining the state of scripting objects, such as JS objects, on a client when navigating in the portal in a way that reloads the document in which the objects are contained, state information can be preserved and incorporated into reloaded documents, and overall system performance can be improved.

In another aspect, the present systems and techniques involve storing, in a shared memory of a client, a scripting object that retains state information for an original document, and in response to a request to load a new document, cloning the stored scripting object to the new document. The original document can be a loaded document, the request can be a request to reload the loaded document, and the new document can be the reloaded document. Storing the scripting object can involve, in response to the load request, copying a reference to the scripting object to the shared memory to cause retention of the scripting object by the client during document loading.

Cloning the stored scripting object to the new document can involve creating a new scripting object in the new document, and copying data from the stored scripting object to the new scripting object. Copying the reference to the scripting object to the shared memory can involve selecting the shared memory based on the original document, and copying the reference to the scripting object to the selected shared memory. Moreover, selecting the shared memory can involve selecting a parent document memory space in a browser if the original document is a frame in the parent document, and selecting a memory space of another browser instance that is related to the original document if the original document is a top level in the browser.

The request to load the new document can be a client event triggered by a user. The state information retained in the scripting object can be user navigation information associated with the original document, and the original document can be a portal page in a portal system. Additionally, the techniques can further involve, in response to the request to load the new document, invoking a new browser instance to load the new document, and cloning the stored scripting object to the new document can involve recursively cloning internal objects of the stored scripting object.

The present techniques can be implemented using an article comprising a machine-readable medium storing instructions operable to cause one or more machines to perform the operations described, and various systems can be employed using these techniques. In one aspect, a system can include a portal that sends portal pages to a client, and a portal page generated by the portal and sent to the client, where the portal page includes scripting code that creates a scripting object at the client. The scripting object can represent a navigation control and retain navigation information associated with the portal page, and, in response to a navigation event generated using the navigation control, the scripting code can cause the client to perform operations including copying a reference to the scripting object to a shared memory of the client to cause the client to store the scripting object during a page load, and cloning the stored scripting object to the loaded page.

The loaded page can include instructions to adjust the cloned scripting object. Cloning the stored scripting object to the loaded page can involve creating a new scripting object in the loaded page, and copying data from the stored scripting object to the new scripting object. Copying the reference to the scripting object to the shared memory can involve selecting the shared memory based on the portal page, and copying the reference to the scripting object to the selected shared memory. The scripting object can include an initialization procedure that implements the cloning of the stored scripting object to the loaded page, and the client can be a Web browser that presents the portal page.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The systems and techniques described here relate to loading documents in a client-server environment. As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files. The terms "reload request" and "reloaded document" mean any request to load a document, and the resulting loaded document, that are related to an original document in that the newly loaded document contains the same state-information-storing scripting object as the original document. The term "page" refers to an electronic document designed for use in presenting information over a network, and is not limited to HTML (HyperText Markup Language) pages.

In a client-server environment, state information in a document presented at a client can be preserved during a document reload from a server, without requiring that the server keep track of the state information. The state information can be represented in a scripting object in the presented document. The scripting object can reflect client-side events, including user-generated events and client-generated events, that change the state information. For example, the scripting object can be a JavaScript navigation object that provides data corresponding to navigation options, and procedures used to manipulate the data. The scripting object can correspond to a component of the presented document, or the scripting object can correspond to the presented document, which can be contained in a frame of a parent document presented by the client. The client-server environment can be a portal environment, and the presented document can be a portal page with dynamic content that uses client-side scripting to effect the content's dynamic behavior. For example, a portal page can be an HTML document with JavaScript included that can interact with the HTML to provide dynamic behavior at the client without requiring additional requests to be sent to the server.

Figure 1:
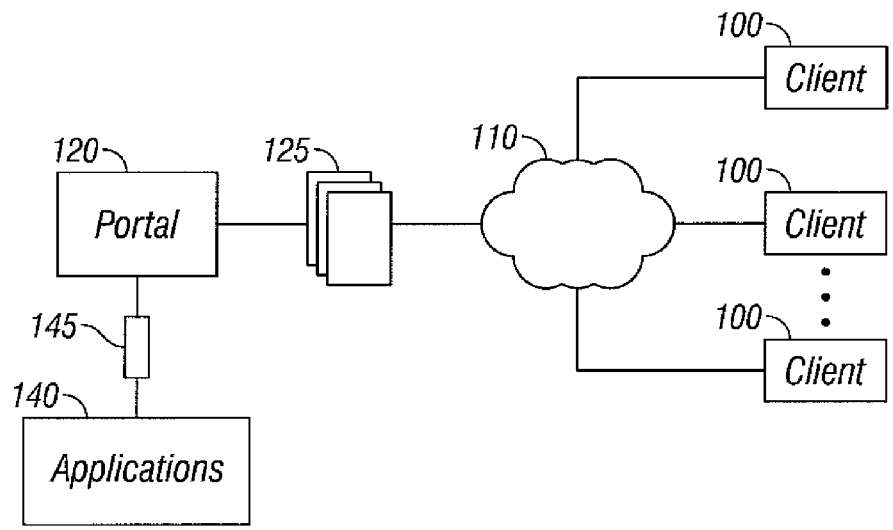
FIG. 1 illustrates a portal-based networked environment.

FIG. 1 illustrates a portal-based networked environment. Multiple clients 100 can access data over a network 110 through a portal 120. The network 110 can be any communication network linking machines capable of communicating using one or more networking protocols, e.g., a local area network (LAN), a wide area network (WAN), an enterprise network, a virtual private network (VPN), a mobile device network and/or the Internet. The clients 100 can be any machines or processes capable of communicating over the network 110. The clients 100 can be browsers and can be communicatively coupled with the network 110 through a proxy server.

The portal 120 provides a common interface to applications 140. The portal 120 receives requests from the clients 100 and uses portal templates to generate information views 125 (e.g., Web pages) in response. The portal 120 can implement a user-roles based system to personalize the common interface and the information views 125 for a user of a client 100. A user can have one or more associated roles that allow personalized tailoring of a presented interface through the generated information views 125. The portal 120 can receive information 145 from the applications 140 to fulfill requests from the clients 100.

The portal 120 can be integrated with an enterprise management system that consolidates multiple application services. The integrated enterprise management system can provide integrated application services to manage business objects and processes in a business enterprise. The business objects and processes can be resources (e.g., human resources), development projects, business programs, inventories, clients, accounts, business products, and/or business services.

The applications 140 can be many types of information sources, including Web services, document repositories, and/or enterprise base systems, such as human resource management systems, customer relationship management systems, financial management systems, project management systems, knowledge management systems, business warehouse systems, time management systems, and electronic file and/or mail systems. The integrated enterprise management system can also include an integration tool, such as the exchange Infrastructure provided by SAP of Walldorf, Germany. The integrated enterprise management system can consolidate and integrate the data and functionality of multiple different applications into a single enterprise management tool provided through the portal.

An enterprise portal and associated enterprise base systems can reside in one or more programmable machines, which can communicate over a network or one or more communication busses. For example, the enterprise portal can reside in one or more servers connected to a public network and can run one or more server software programs. The enterprise portal can include a portal platform in communication with a navigation platform accessed by the user. The portal platform can include a Web server, a page builder, and an information view (AKA, integration view or iView) server. The portal platform can also include a unification server, user management components (e.g., a Corporate LDAP (Lightweight Directory Access Protocol) Directory and a Portal LDAP Directory), and a database repository. The database repository can include an SQL (Structured Query Language) Database and a Portal Content Directory (PCD).

The database repository and user management components form at least part of a persistency layer for storage of the portal platform's metadata. Moreover, the enterprise portal can include, or be in communication with, various other enterprise systems, such as a knowledge management platform, a text retrieval and extraction server, and a business warehouse platform. The knowledge management platform can be software for data preparation, including workflow, publishing, feedback, analysis, discussion, querying, indexing, profiling, concurrency control, and classification functionality.

The information views 125 generated by the portal 120 can be documents and/or portions of documents, such as HTML documents, delivered to the clients 100 using a document transfer protocol (e.g., Hypertext Transfer Protocol). A delivered document can retrieve dynamic content that wasn't located in the initial document. The delivered document can create a scripting object on a client, and the scripting object can be used to interact with the server (e.g., using an XML over HTTP protocol) to retrieve dynamic content and save current state information for the dynamic content. This state information can correspond to any changeable aspect of the delivered document. For example, the state information can correspond to a visual attribute of a page object (e.g., a graphic icon on a page with more than one possible visual state, such as a folder icon with an opened state and a closed state). The state information also can correspond to a document navigation presentation (e.g., a tree navigation control).

When writing dynamic pages to run on a browser, scripting objects, such as JavaScript (JS) objects, can be used to implement the dynamic behavior of the pages. Event triggering and actions of a user (e.g., navigation actions) can be represented in a scripting object, which can maintain a state that reflects a specific flow of actions performed by the user. For example, clicking on a node in a tree control can cause creation of a new object with attributes, meaning the JS object corresponding to the tree has changed its state. This state has no representation in the initially loaded document, and thus in traditional portal systems, this state cannot be reproduced when a request for reloading the page is executed, unless the server keeps track of client-side state changes. Without adequate provision to store the client-side state information, the result of reloading the document can be the loss of the data generated dynamically by the user.

Figure 2:
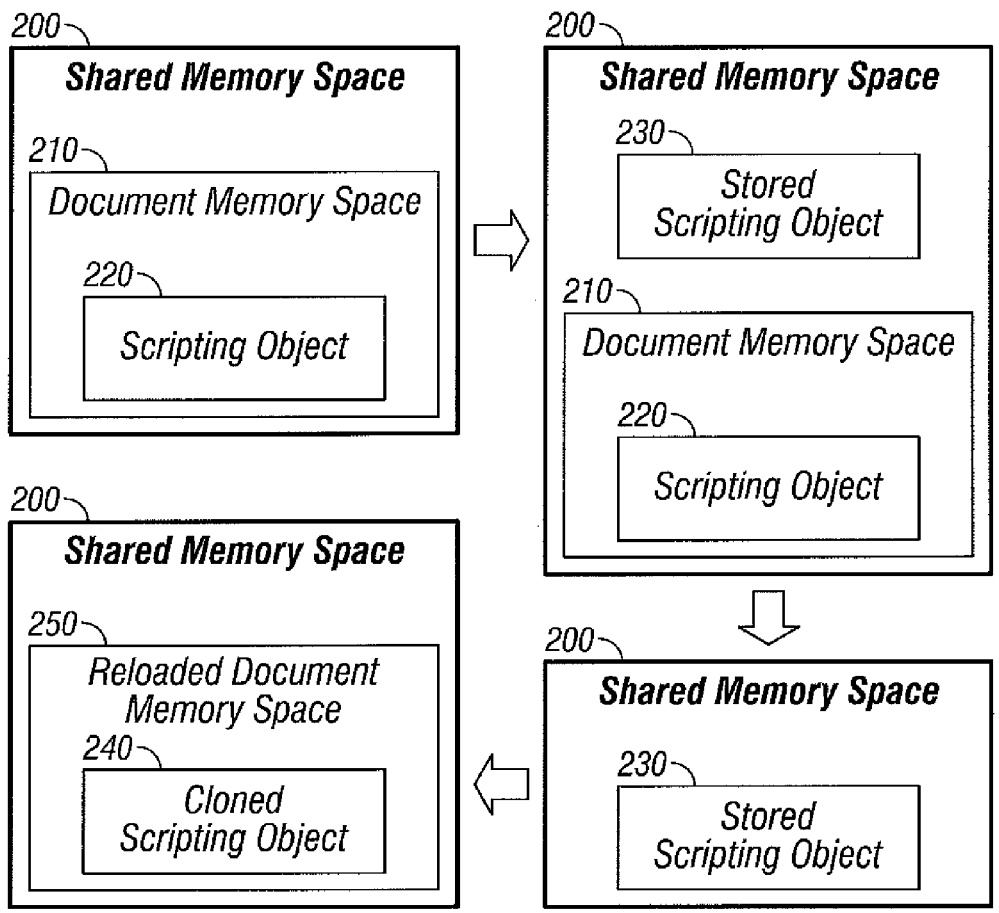
FIG. 2 illustrates client-side state preservation during a document reload.

FIG. 2 illustrates client-side state preservation during a document reload. A shared memory space 200 can be used to store a scripting object 220 that retains state information for a loaded document. The scripting object 220 can be stored in the shared memory 200 by copying the object 220, or by copying a reference to the object 220, from a document memory space 210 to the shared memory 200, resulting in a stored scripting object 230. When the document is reloaded, the document memory space 210 is eliminated, but the scripting object 220 is preserved by the stored scripting object 230.

During the document reload, the stored scripting object 230 can be cloned to the reloaded document, creating a cloned scripting object 240 in a reloaded-document memory space 250. The shared memory 200 can be the memory scope of a parent document, where the document with the scripting object is in a frame of the parent document. The shared memory 200 can also be the memory scope of another browser instance, which may already be available or may be invoked in response to the document reload in order to retain the scripting object; or the new browser instance can be used to reload the document while the original browser instance is used to preserve the scripting object 220.

Figure 3:
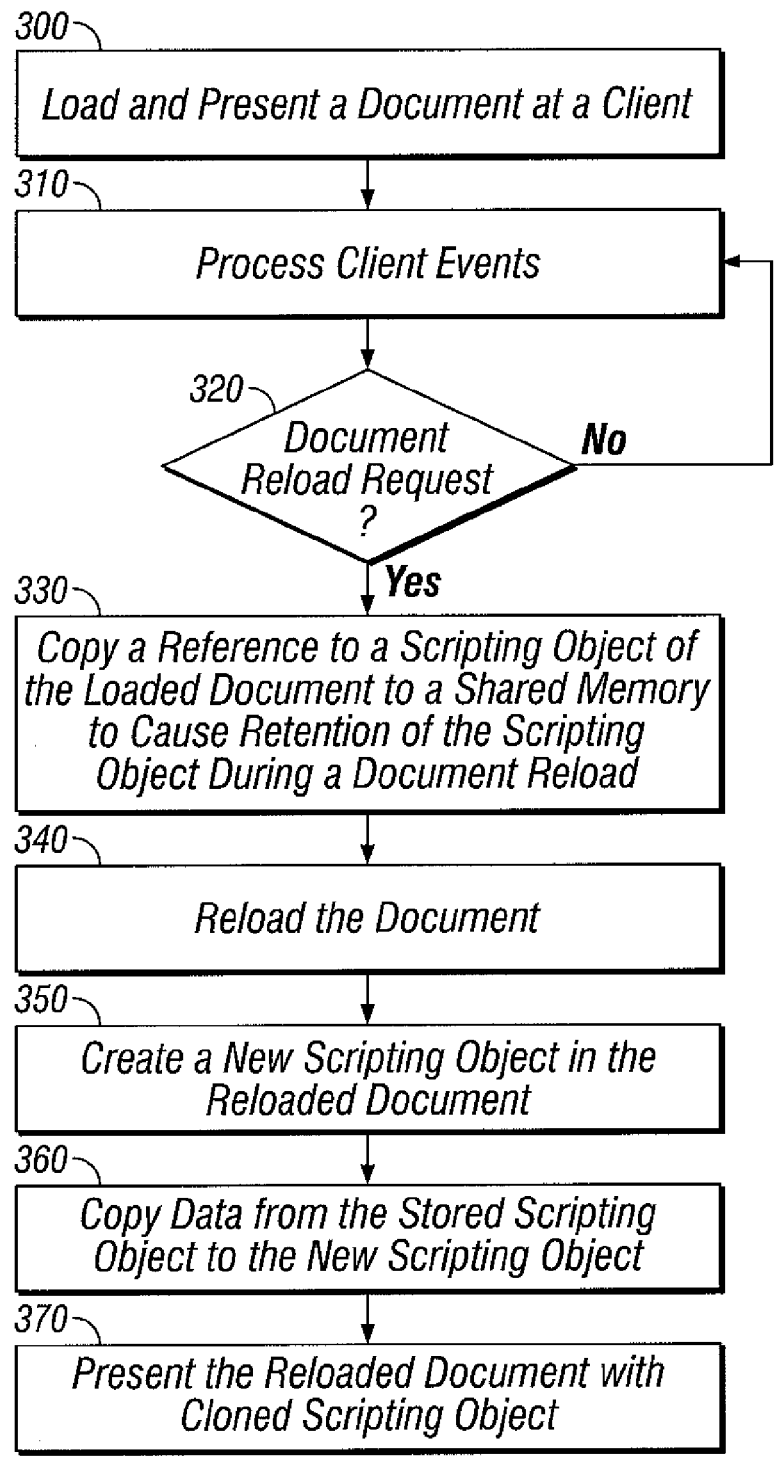
FIG. 3 is a flowchart illustrating client-side state preservation using a scripting-object cloning technique.

FIG. 3 is a flowchart illustrating client-side state preservation using a scripting-object cloning technique. A document can be loaded and presented at a client at 300. The document can be an HTML page with JavaScript to effect dynamic client-side behavior in the page. Client events can be processed at 310 until a document reload request is received at 320. Client events can be any actions or occurrences detected by the client, including user input actions or client system occurrences. Typically, the events are user-triggered events that change the state of a scripting object loaded in the page. There can be a series of user actions on the scripting object that changes the state of the object over time.

The document reload request can be generated in response to a user navigation event. The page navigation model used can be such that a navigation event within a page triggers a reload of the page, while some of the client-side state information in the page should be maintained despite the page reload. When a document reload request is generated and client-side state information should be preserved, a scripting object that retains state information for the loaded document can be stored, and storing the scripting object can involve copying only a reference to the scripting object.

A reference to the scripting object of the loaded document can be copied to a shared memory at 330. This causes retention of the scripting object during the document reload. For example, a JS object reference can be stored on the browser in a shared memory space. Because the object in the document is referenced in the shared memory space, the browser retains the object during the document reload. Copying the reference to the object to the shared memory prevents the object from being released when the document is reloaded, thus saving the state information in the object. Storing the scripting object by copying a reference to it, instead of copying the object itself, can result in better performance and an improved portal system.

Copying the scripting object reference to the shared memory can involve selecting the shared memory based on the loaded document, and copying the reference to the scripting object to the selected shared memory. A parent document memory space in a browser instance can be selected if the loaded document is a frame in the parent document. A memory space of another browser instance can be selected if the loaded document is a top level in the browser. The other browser instance can already be available at the time of the document reload request, or the other browser instance can be invoked in response to the document reload request. In general, the shared memory should have a memory scope that is outside the reloaded document, but be accessible from the reloaded document.

The document is reloaded at 340, and the stored scripting object is cloned to the reloaded document. A new scripting object can be created in the reloaded document at 350. Data from the stored scripting object can be copied to the new scripting object at 360. The state information of the scripting object can be included in the data and/or in the structure of the object. This cloning process provides a simple way to reconnect the stored object with the new document received from the server. Creating a new scripting object in the reloaded document automatically connects the object's procedures to the reloaded document (i.e., the procedures point to a valid address in the new document), and copying the stored object data into the new object can preserve the object state as it existed before the reload. Without this treatment, the methods to the link will point to an unloaded document and therefore be "dead links." In order to maintain efficiency, the cloning may be performed only once per reload of the document.

The object cloning can also involve recursively cloning internal objects inside the stored scripting object. Thus, state information retained in the structure of the scripting object, which can have many internal objects, can also be preserved. The object cloning can be implemented using scripting code included in the reloaded document. The scripting object can have an initialization procedure that captures the original object data, thus the original object can be recreated, with all its state information, in the reloaded page. Once the scripting object has been cloned to the reloaded document, the reloaded document can then be presented at 370.

FIGS. 4-7 illustrate an example portal presentation 400 with dynamic content. The portal presentation 400 can be a standard Web browser window and can include a menu bar 410 and a buttons bar 420. The portal presentation 400 also includes navigation areas. A top level navigation area 430 provides role-based and user-based options for a current user. Navigation areas 440, 460, 470 can provide a simple point and click user interface to a navigation hierarchy. A first navigation area 440 displays a graphical hierarchical structure of expanding/collapsing containers and unit nodes, which can be used to launch application units and/or present data in an iView. An iView can be a small application that displays information and may constitute the basic unit of portal content.

Figure 4:
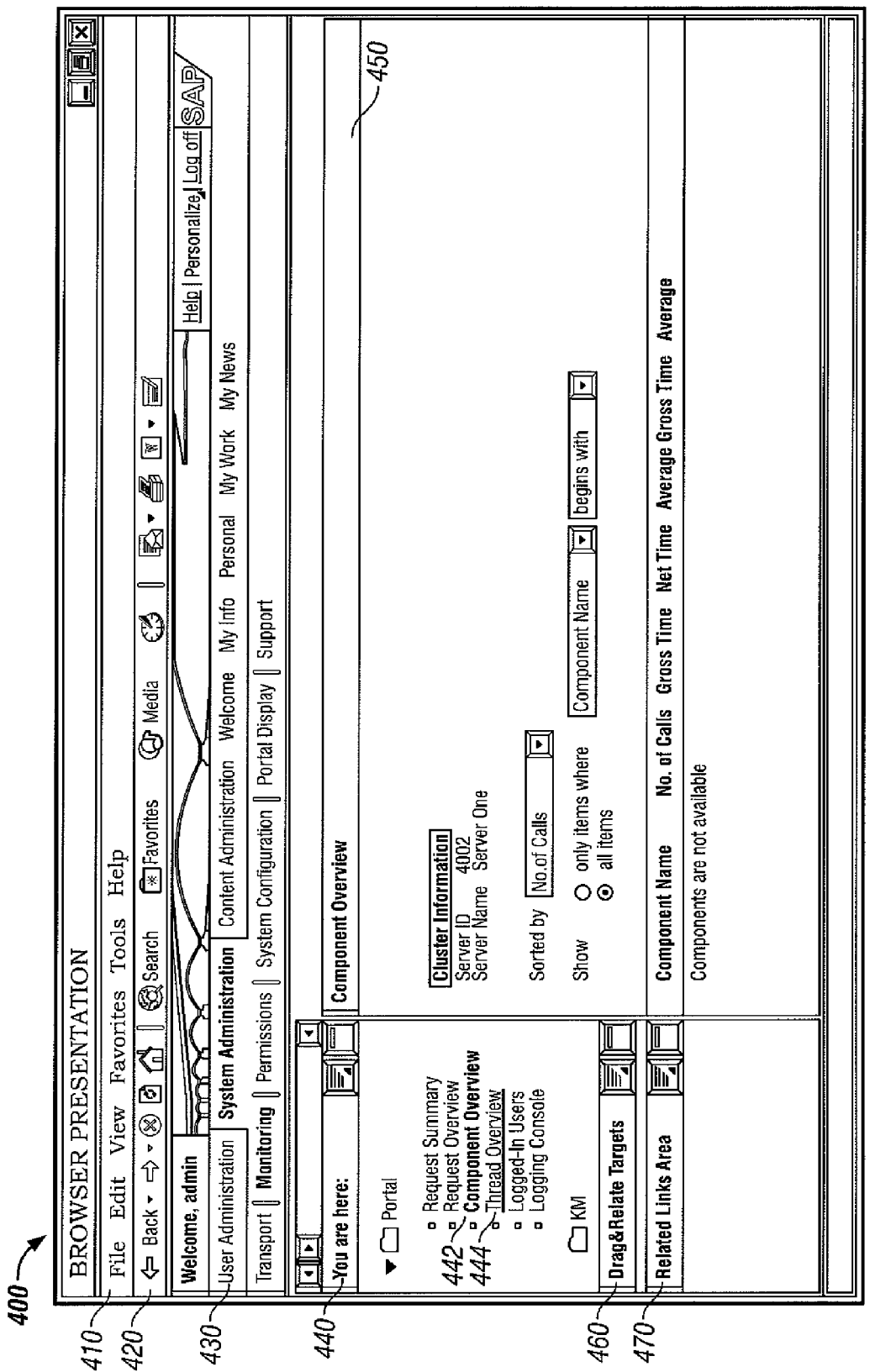
FIGS. 4-7 illustrate an example portal presentation with dynamic content.

As shown in FIG. 4, a Component Overview link 442 in the navigation area 440 has already been selected, and thus a work area 450 presents Component Overview information corresponding to the selected node of the navigation hierarchy. The Drag&Relate area 460 can present any Drag&Relate links associated with the selected node, and the Related Links Area 470 can present any other links associated with the selected node. The navigation area 440, the work area 450, the Drag&Relate area 460 and the Related Links Area 470 can all be created using inline frames in a single delivered page. This delivered page can in turn be a frame within a parent page that creates the top level navigation area 430.

When a user clicks on a Thread Overview link 444, this generates a client navigation event, which is caught by the top level navigation (or if absent, by any other component responsible for reloading 440,450,360,470) and causes reloading of the single delivered page with the areas 440, 450, 460, 470. In the reloaded page, the work area 450 can present new information, which may be independent of prior client-side interactions with the dynamic page. However, the navigation area 440 has a corresponding scripting object implementing the tree control, and this scripting object holds client-side state information that should be retained despite the page reload.

Figure 5:
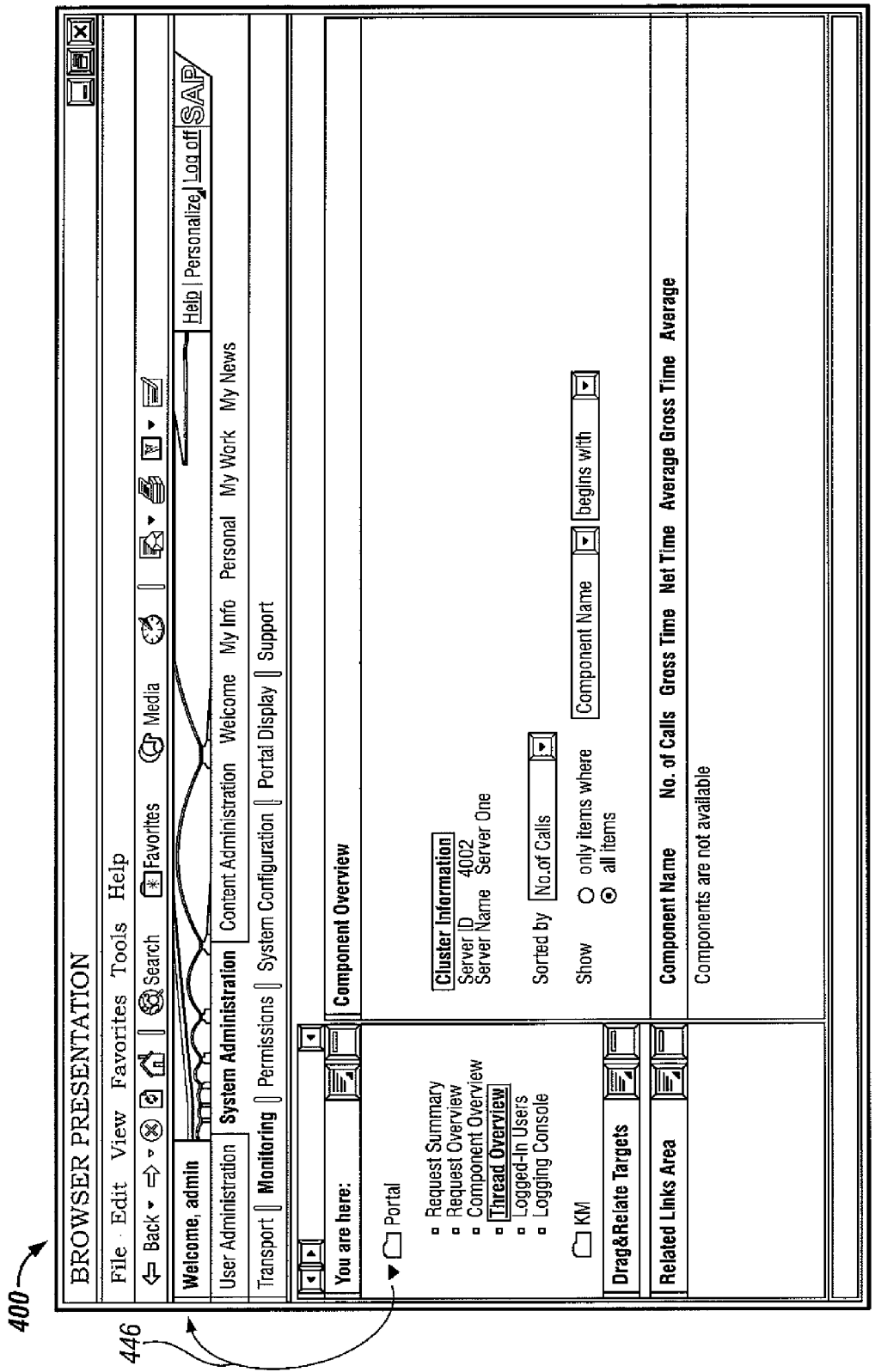
Figure 6:
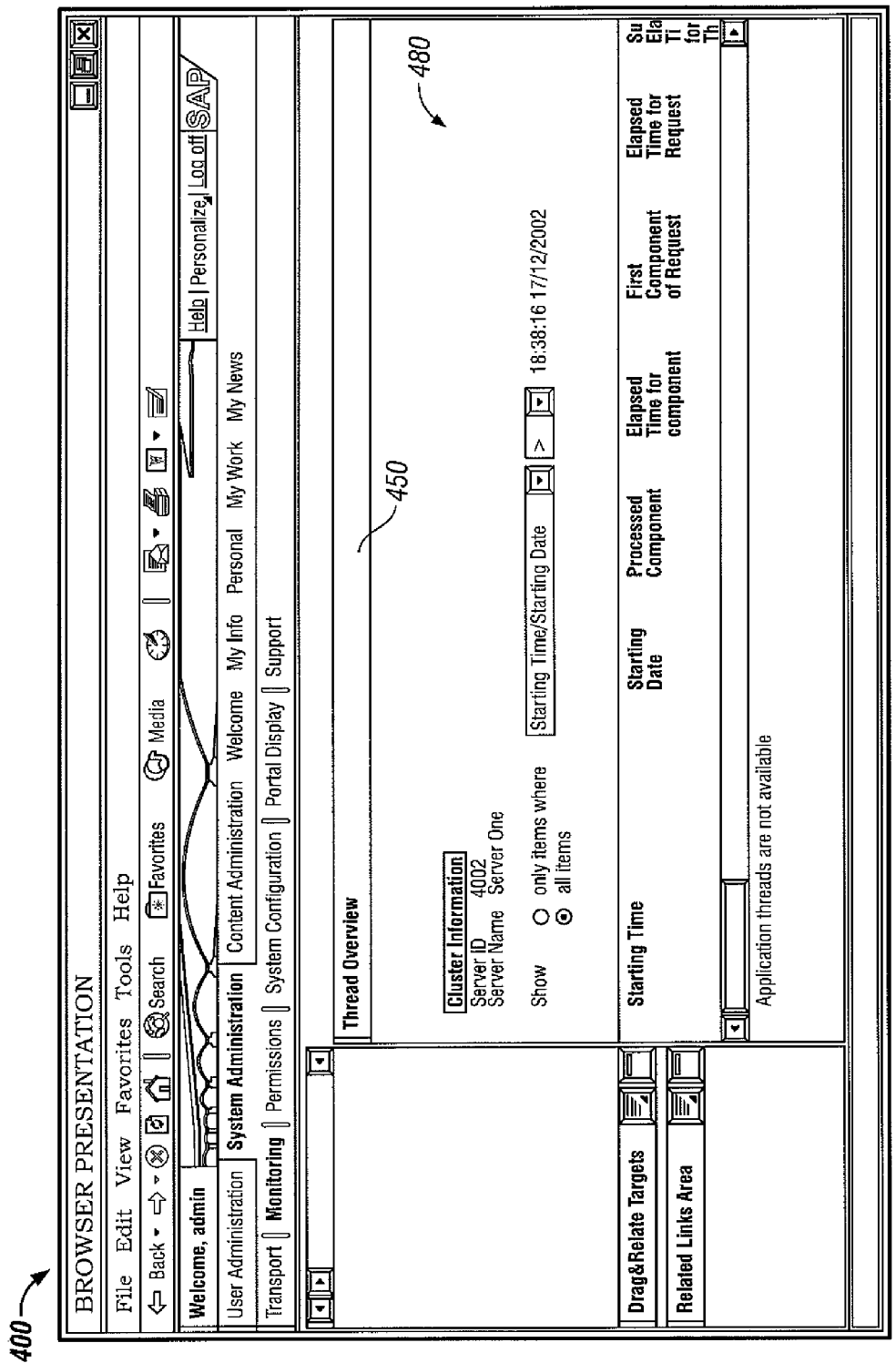
Figure 7:
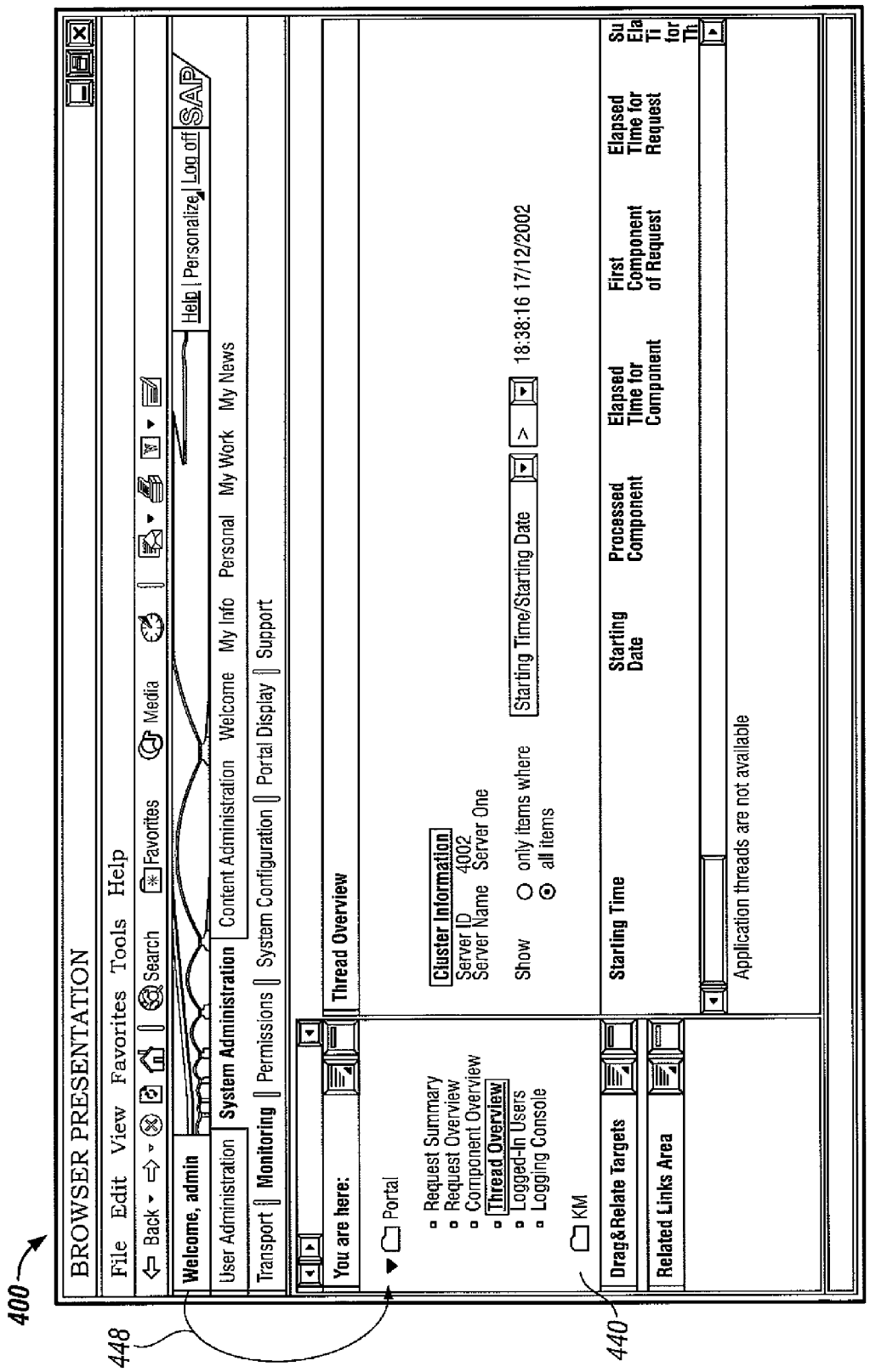

The scripting object is updated in light of the navigation event. Then, as illustrated in FIG. 5, a reference to the scripting object is copied 446 to the shared memory in the topmost frame. The page can then be reloaded, and as shown in FIG. 6, the work area 450 of the reloaded page presents new information 480 concerning the Thread Overview node. Finally, as shown in FIG. 7, the tree scripting object is cloned 448 back to the empty iView, which results in the navigation area 440 being displayed again, after reloading, with the client-side state information that was present before the page reload. Thus, when only part of a page is to be reloaded with new information from a server, and another part of the page is to retain its current client-side state information, a reload of the entire page can be performed while preserving the desired client-side state information.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network).

Although only a few embodiments have been described in detail above, other modifications are possible. The logic flows depicted in the figures do not require the particular order shown, or sequential order, to achieve desirable results, and in certain implementations, multitasking and parallel processing may be preferable. Other embodiments may be within the space of the following claims.

What is claimed is:

1. An article comprising a tangible machine-readable storage medium storing instructions operable to cause one or more machines to perform operations comprising:

storing, in a shared memory of a client, a scripting object that retains state information for an original document, the storing comprising copying a reference to the scripting object to the shared memory to cause retention of the scripting object by the client during document loading, the copying comprising selecting the shared memory based on the original document and copying the reference to the scripting object to the selected shared memory, the selecting the shared memory comprising selecting a parent document memory space in a browser if the original document is a frame in the parent document; and in response to a request to reload a new document, the new document being previously loaded, cloning the stored scripting object to the new document by creating a new scripting object in the new document and copying data from the stored scripting object to the new scripting object.

2. The article of claim 1, wherein cloning the stored scripting object to the new document comprises:
   creating a new scripting object in the new document; and
   copying data from the stored scripting object to the new scripting object.

3. The article of claim 1, wherein the request to load the new document comprises a client event triggered by a user.

4. The article of claim 1, wherein the state information retained in the scripting object comprises user navigation information associated with the original document, and the original document comprises a portal page in a portal system.

5. The article of claim 1, further comprising, in response to the request to load the new document, invoking a new browser instance to load the new document.

6. The article of claim 1, wherein cloning the stored scripting object to the new document comprises recursively cloning internal objects of the stored scripting object.

7. A system comprising:
   a portal that sends portal pages to a client; and
   a portal page generated by the portal and sent to the client, the portal page having scripting code that creates a scripting object at the client the scripting object representing a navigation control and retaining navigation information associated with the portal page, the scripting object sending the state information to a server each time an action at the client changes the state information,
   wherein, in response to a navigation event generated using the navigation control, the scripting code causes the client to perform operations comprising:
   copying a reference to the scripting object to a shared memory of the client to cause the client to store the scripting object during a page load, and
   cloning the stored scripting object to the loaded page;
   wherein copying the reference to the scripting object to the shared memory comprises:
   selecting the shared memory based on the portal page; and
   copying the reference to the scripting object to the selected shared memory,
   wherein selecting the shared memory comprises:
   selecting a parent document memory space in a browser if the portal page is a frame in the parent document; and
   selecting a memory space of another browser instance if the portal page is a top level in the browser.

8. The system of claim 7, wherein the loaded page comprises instructions to adjust the cloned scripting object.

9. The system of claim 7, wherein cloning the stored scripting object to the loaded page comprises:
   creating a new scripting object in the loaded page; and
   copying data from the stored scripting object to the new scripting object.

10. The system of claim 7, wherein cloning the stored scripting object to the loaded document comprises recursively cloning internal objects of the stored scripting object.

11. The system of claim 7, wherein the scripting object includes an initialization procedure that implements the cloning of the stored scripting object to the loaded page.

12. The system of claim 7, wherein the client comprises a Web browser that presents the portal page.

13. A method comprising:
    storing, in a shared memory of a client, a scripting object that retains state information for an original document, the storing comprising copying a reference to the scripting object to the shared memory to cause retention of the scripting object by the client during document loading, the copying comprising selecting the shared memory based on the original document and copying the reference to the scripting object to the selected shared memory, the selecting the shared memory comprising selecting a parent document memory space in a browser if the original document is a frame in the parent document; and
    in response to a request to reload a new document, the new document being previously loaded, cloning the stored scripting object to the new document by creating a new scripting object in the new document and copying data from the stored scripting object to the new scripting object.

14. The method of claim 13, wherein cloning the stored scripting object to the new document comprises:
    creating a new scripting object in the new document; and
    copying data from the stored scripting object to the new scripting object.

15. The method of claim 13, wherein the request to load the new document comprises a client event triggered by a user.

16. The method of claim 13, wherein the state information retained in the scripting object comprises user navigation information associated with the original document, and the original document comprises a portal page in a portal system.

17. The method of claim 13, further comprising, in response to the request to load the new document, invoking a new browser instance to load the new document.

18. The method of claim 13, wherein cloning the stored scripting object to the new document comprises recursively cloning internal objects of the stored scripting object.

19. A method comprising:
    storing, in a shared memory of a client, a scripting object that retains state information for an original document, the storing comprising copying a reference to the scripting object to the shared memory to cause retention of the scripting object by the client during document loading, the copying comprising selecting the shared memory based on the original document and copying the reference to the scripting object to the selected shared memory, the selecting the shared memory comprising selecting a memory space of another browser instance that is related to the original document if the original document is a top level in the browser; and
    in response to a request to reload a new document, the new document being previously loaded, cloning the stored scripting object to the new document by creating a new scripting object in the new document and copying data from the stored scripting object to the new scripting object.

20. An article comprising a tangible machine-readable storage medium storing instructions operable to cause one or more machines to perform operations comprising:
    storing, in a shared memory of a client, a scripting object that retains state information for an original document, the storing comprising copying a reference to the scripting object to the shared memory to cause retention of the scripting object by the client during document loading, the copying comprising selecting the shared memory based on the original document and copying the reference to the scripting object to the selected shared memory, the selecting the shared memory comprising selecting a memory space of another browser instance that is related to the original document if the original document is a top level in the browser; and in response to a request to reload a new document, the new document being previously loaded, cloning the stored scripting object to the new document by creating a new scripting object in the new document and copying data from the stored scripting object to the new scripting object.

21. An apparatus comprising:

means for storing, in a shared memory of a client, a scripting object that retains state information for an original document, the storing comprising copying a reference to the scripting object to the shared memory to cause retention of the scripting object by the client during document loading, the copying comprising selecting the shared memory based on the original document and copying the reference to the scripting object to the selected shared memory, the selecting the shared memory comprising selecting a memory space of another browser instance that is related to the original document if the original document is a top level in the browser; and means for cloning the stored scripting object to the new document, in response to a request to reload a new document, the new document being previously loaded, by creating a new scripting object in the new document and copying data from the stored scripting object to the new scripting object.

22. An apparatus comprising:

means for storing, in a shared memory of a client, a scripting object that retains state information for an original document, the storing comprising copying a reference to the scripting object to the shared memory to cause retention of the scripting object by the client during document loading, the copying comprising selecting the shared memory based on the original document and copying the reference to the scripting object to the selected shared memory, the selecting the shared memory comprising selecting a memory space of another browser instance that is related to the original document if the original document is a top level in the browser; and means for cloning the stored scripting object to the new document, in response to a request to reload a new document, the new document being previously loaded, by creating a new scripting object in the new document and copying data from the stored scripting object to the new scripting object.

* * * * *